March 27, 1962
C. A. IRAZOQUI
3,026,634
AUDIO-VISUAL ELECTRONIC INSTRUCTOR
Filed Feb. 11, 1959
4 Sheets-Sheet 1
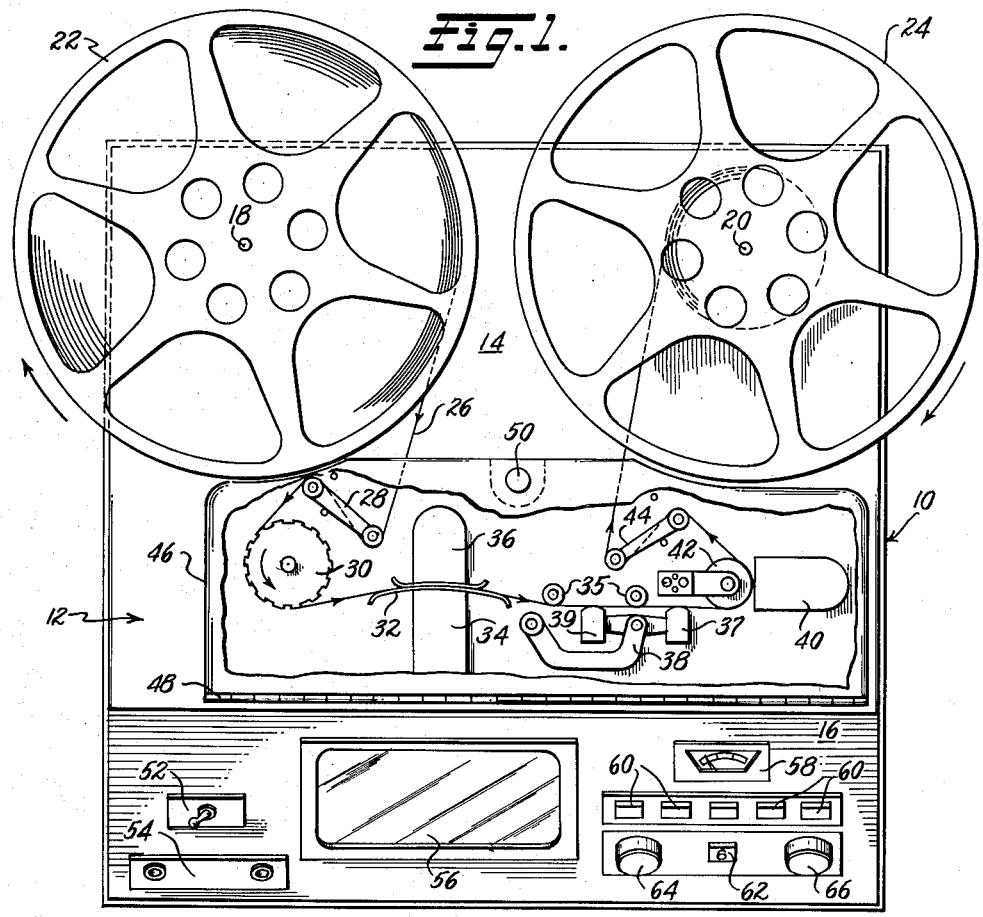
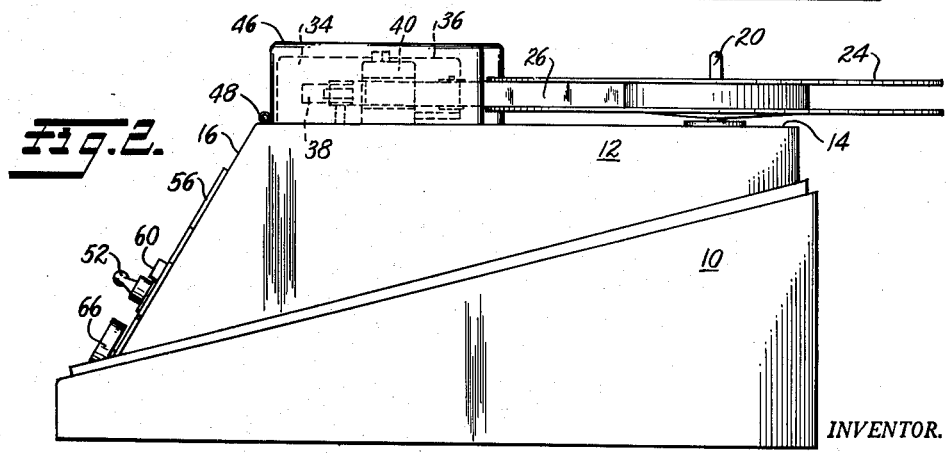
INVENTOR.
BY Carlos A. Irazoqui
Bacon & Thomas
ATTORNEYS March 27, 1962 — C. A. IRAZOQUI — 3,026,634
AUDIO-VISUAL ELECTRONIC INSTRUCTOR
Filed Feb. 11, 1959 — 4 Sheets-Sheet 2
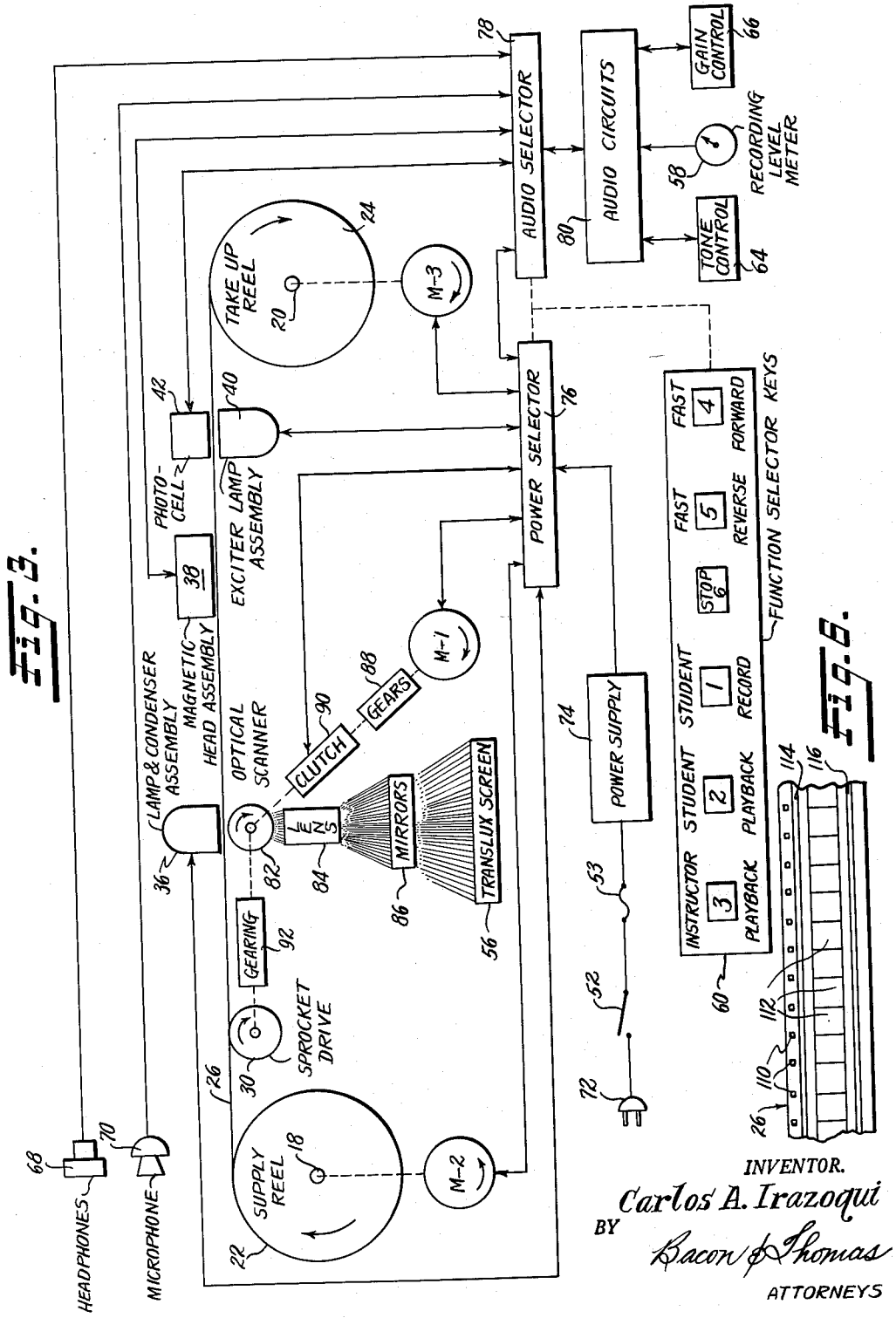
INVENTOR.
Carlos A. Irazoqui
BY
Bacon & Thomas
ATTORNEYS

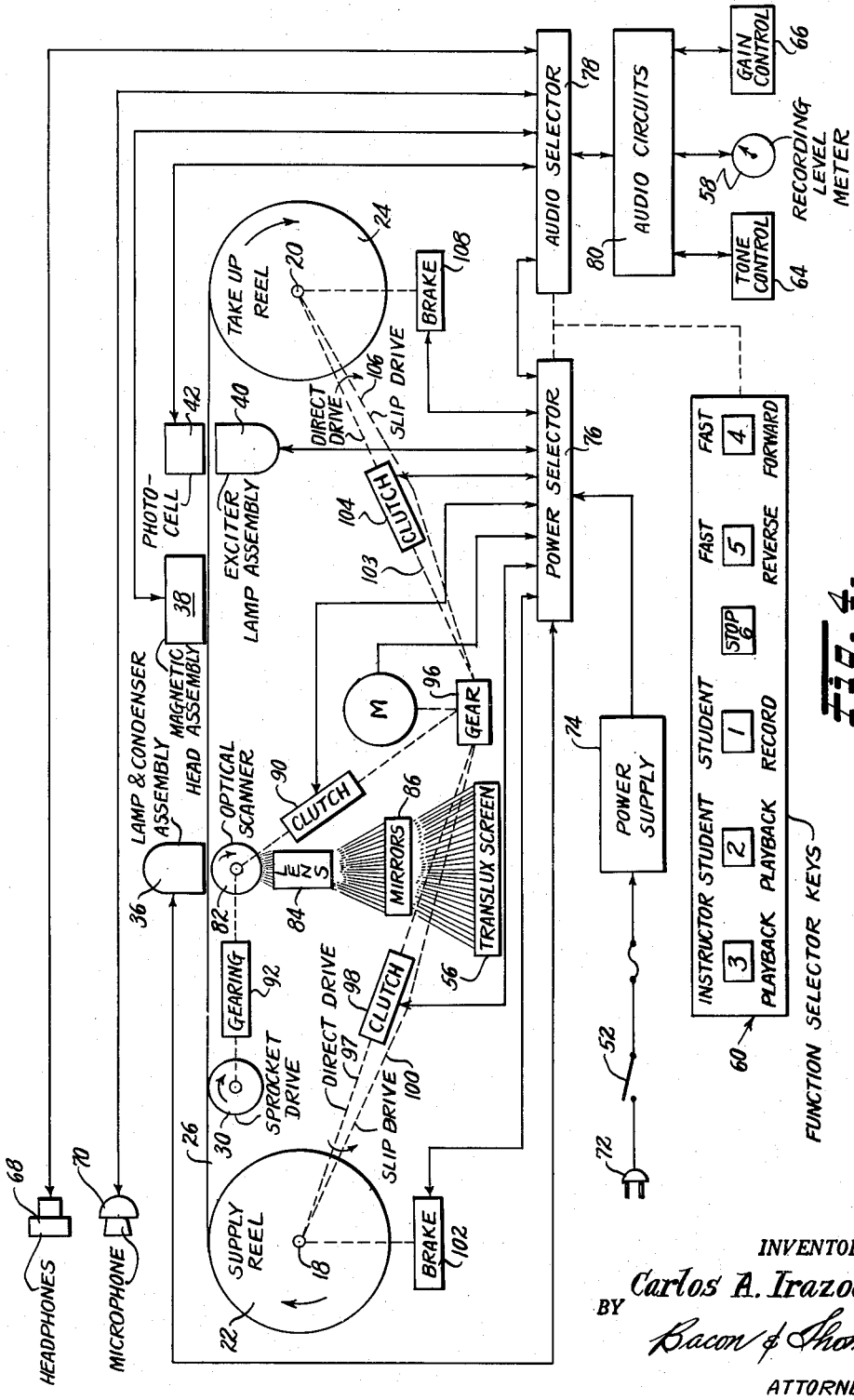

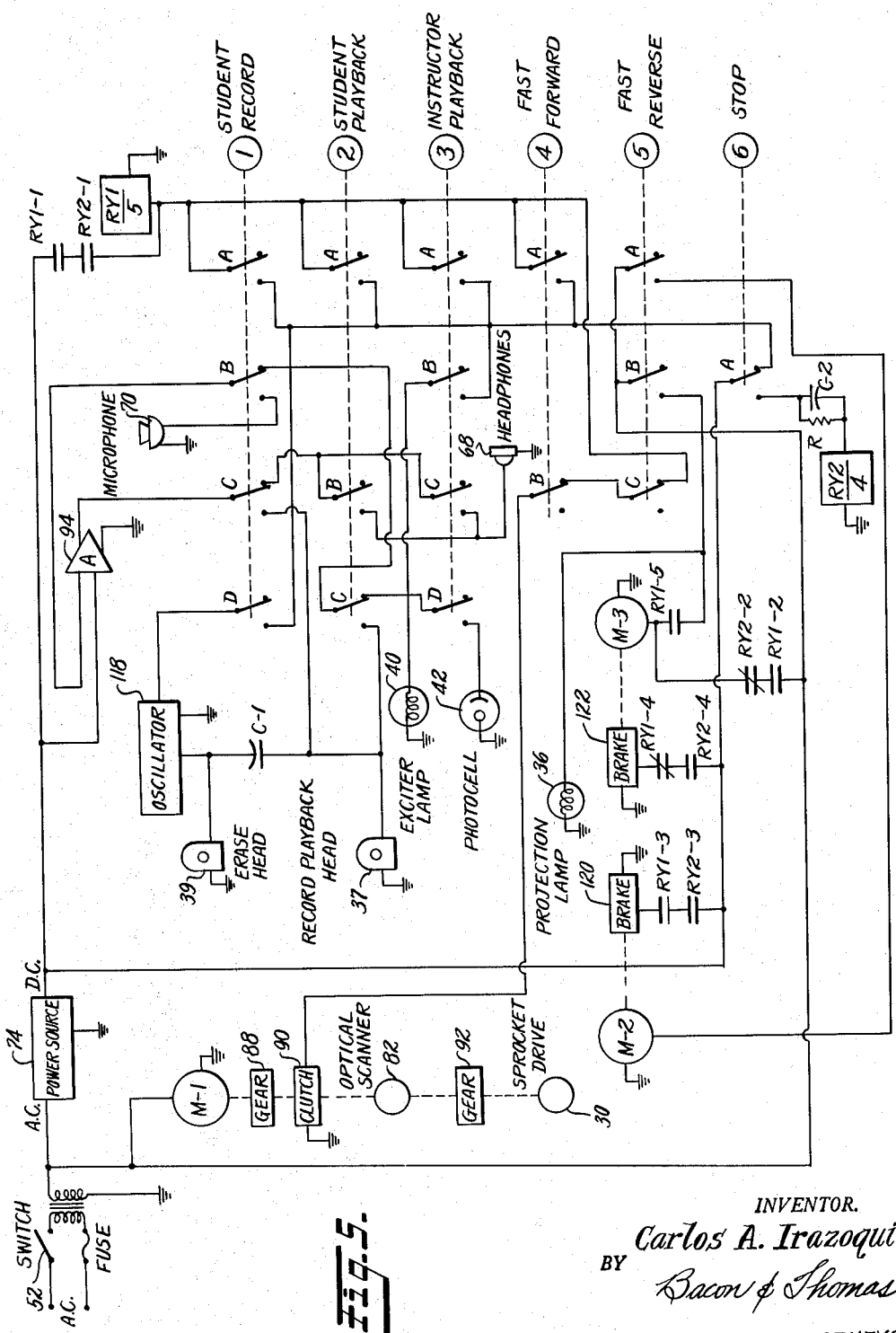

United States Patent Office 3,026,634
Patented Mar. 27, 1962

3,026,634
AUDIO-VISUAL ELECTRONIC INSTRUCTOR
Carlos A. Irazoqui, New York, N.Y., assignor to
Linguatronics, Inc., Washington, D.C.
Filed Feb. 11, 1959, Ser. No. 792,544
8 Claims. (Cl. 35—35)

This invention relates to a method and an apparatus for instruction and more specifically to a method and an apparatus intended for the audio-visual instruction in the pronunciation and meaning of words. While the apparatus is intended principally for the teaching of foreign languages, it has far wider application, such as, for example, in training in musical instruction, speech and accent correction, acting and elocution. In addition, it can provide a new and valuable tool in certain specialized pedagogical fields, as in the teaching of certain types of deaf-mutes, monitoring of aptitude tests, examinations, etc.

The use of various forms of recordings has been previously proposed in the field of instruction of foreign languages, in which the student can learn by hearing the pronunciation of certain words or sentences, and then repeating such words or sentences. This method of learning by listening and attempting to repeat has definite limitations, as there is still lacking the office of the instructor in determining whether the repeated words have been properly accented and pronounced, and in demonstrating the proper accent and pronunciation. In the pronunciation of certain foreign words, it is often necessary for the student to actually study the form of the mouth when the particular word is uttered.

It is an object of this invention, therefore, to provide a method of teaching which involves a combination of steps wherein the student simultaneously hears the recorded word or sound and views a motion picture of the instructor to study the oral expressions or the motions made in producing the sound while the word is uttered or the sound is made, recording while the student repeats the word or sound, playing back the student's repeated and recorded word or sound, and comparing it with the instructor's recorded sound.

It is a further object of the invention to provide a novel apparatus by means of which the above method can be practiced.

It is a further object of the invention to provide a novel electronic apparatus including a scanning mechanism to project a pictorial image on a screen, an exciter and photo-cell to transform an optical sound track signal to an audible signal, and a magnetic recording and playback circuit cooperating with a magnetic sound track together with the required controls by means of which the student may operate a film carrying a picture, an optical sound track and a magnetic sound track to selectively (1) traverse the picture and the instructor's optical sound track, (2) traverse the student's recording of the repeated sound and the picture, and (3) traverse the student's playback of his recorded sound and the picture.

Other and further objects of the invention will be apparent from the following description taken in conjunction with the accompanying drawings, in which:

FIG. 1 is a plan view of a preferred form of the apparatus;

FIG. 2 is an end view thereof, as viewed from the right of FIG. 1;

FIG. 3 is a diagrammatic showing of the mechanical and electrical circuits for a three motor drive;

FIG. 4 is a diagrammatic showing of the mechanical and electrical circuits for a single motor drive;

FIG. 5 shows the electrical circuit for the three motor drive diagrammatically represented in FIG. 3; and FIG. 6 shows one form of film that can be used.

Referring to FIGS. 1 and 2, illustrating a preferred embodiment, there is shown at 10 the lower part of a carrying case for the apparatus. Within the carrying case, there is a housing 12, provided with a top deck 14 and an inclined viewing and control panel 16. Passing upward through deck 14 are a pair of spaced spindles 18 and 20, adapted to removably receive a supply reel 22 and a take-up reel 24. The supply reel 22 is mounted on spindle 18 and contains a film 26 used in the apparatus.

The film 26 is adapted to pass under or through the following elements, disposed forwardly of the reels, in series: tension idler 28, sprocket wheel 30, film gate 32, guide roller 35, record playback head 37, exciter lamp assembly 40 and photoelectric drum 42, tension idler 44 and take-up reel 24. The erase head 39 and record playback head 37 form part of a magnetic head assembly 38 mounted for pivotal movement on the deck 14 in a manner well known in the art. On opposite sides of the film gate 32 there are provided an optical scanner assembly 34 and a lamp and condenser assembly 36, forming a part of the picture projection system. All of these elements on deck 14, except the reels, are protected by a cover 46 hinged at 48. A cover latch 50 retains the cover 46 in closed position.

Panel 16 includes the following elements:

Main power switch 52
Microphone and headphone jacks 54
Translux screen 56
Recording level meter 58
Function selector keys 60
Stop key 62
Tone control 64
Gain control 66

One form of film 26 that may be employed in this apparatus is shown in FIG. 6, and comprises a series of sprocket openings 110 on either side of a series of picture frames 112. Between the picture frames 112 and the sprocket openings 110, there are provided an optical sound track 114 and a magnetic sound track 116. While, in the form shown, the two sound tracks are disposed on opposite sides of the picture frames 112, it is obvious that they may be disposed on the same side if desired.

There are six function selector keys 60, being numbered 1, 2, 3, 4, 5 and 6 in FIGS. 3, 4 and 5 for convenience in describing their operations. These keys actuate the following functions:

Key 1, student record;
Key 2, student playback;
Key 3, instructor playback;
Key 4, fast forward;
Key 5, fast reverse;
Key 6, stop.

FIG. 3 illustrates one form of the invention employing three independent driving motors designated as M-1, M-2, and M-3. In this figure, the electrical circuit is illustrated by means of single solid lines and the mechanical connections are indicated by broken lines. The headphones 68 and microphone 70 are shown as connected with an audio selector 78, which selector, in turn, is connected to audio circuits 80. Audio circuits 80 are connected with tone control 64, gain control 66, and recording level meter 58, in the conventional manner well known in the art. A plug 72 is connected with a source of alternating current, being electrically connected to a power supply 74 through a main power switch 52 and a fuse 53. Power supply 74 is electrically connected to power selector 76, from which conductors extend to the motors M–1, M–2, M–3, exciter lamp assembly 40, audio selector 78, lamp and condenser assembly 36, and magnetic clutch 90. Audio selector 78 is also electrically connected with photocell 42 and with magnetic head assembly 38. The function selector keys 1 to 6, inclusive, are mechanically connected to the power selector 76 and audio selector 78 as indicated in broken lines.

Motor M–1 is a constant speed synchronous motor and is adapted to drive optical scanner 82 and sprocket drive 30 at synchronous speeds. It is connected to these elements by means of gearing 88, clutch 90 and gearing 92, as diagrammatically shown in the drawing. Clutch 90 is preferably of the type that can be electromagnetically actuated. Motor M–2 is directly connected with the spindle 18 for supply reel 22, and when energized, is effective to reverse the direction of feed, or to rewind the film on the supply reel. Motor M–3 is directly connected with the spindle 20 for take-up reel 24, and supplies power thereto when the film traverses in its forward direction.

From the foregoing, it is evident that the film, in traversing in a forward direction, passes from supply reel 22 to take-up reel 24, over the sprocket drive 30, between the lamp and condenser assembly 36, and the optical scanner 82. Motor M–1 is adapted to drive the optical scanner 82 and the sprocket drive 30 at a constant non-intermittent speed of preferably 24 frames per second. Optical scanner 82 is of a type well known in the art comprising a rotating optical device synchronized with the speed of the film and adapted to project a picture by the use of lens 84 and mirrors 86 onto the trans-lux screen 56 in a conventional manner. From the optical scanner, the film traverses the magnetic head assembly 38, having thereon the erase head 39 and the record playback head 37. The heads 37 and 39 are aligned with the magnetic sound track 116 on film 26 and, depending on which electrical circuits are energized, are effective to either record, play back, or erase the magnetic sound signal impressed on the track. From the magnetic head assembly 38, the film passes between the photocell 42 and the exciter lamp assembly 40, which assembly is arranged to direct a light beam through the optical sound track on the film. The variable light signal is changed to an electrical signal, which is amplified and changed to an audio signal in a manner well known in the art.

The motor M–3 is designed for slow, normal forward and for rapid forward traverse, while motor M–2 is designed for rapid reverse traverse.

FIG. 5 schematically illustrates one form of electrical control circuit for the three motor system of FIG. 3 in which the push buttons or keys 1, 2, 3, 4, 5 and 6 are shown as mechanically connected to control switches.

Referring to FIG. 5, showing a schematic circuit in which the legends RY1–3, RY2–2 etc. refer to contacts 3 and 2, respectively, in Relays 1 and 2, the operation is as follows: on depressing the Student Record key 1, the switch 1–A is closed to actuate Relay 1. Contact RY1–2 supplies alternating current to the forward take-up motor M–3, and through RY1–5 to the projection lamp 36. The other contacts on RY1 have no function at this time. Switch 1–B connects the microphone 70 to the amplifier input 94, switch 1–C supplies the amplifier output to the record playback head, and switch 1–D supplies direct current to the oscillator 118, the output of which feeds the erase head 39 and also supplies the necessary bias current to the record playback head 37 through capacitor C–1.

On depressing the Student Playback key 2, switch 2–A energizes Relay 1 which has the same functions which have been described above. Switch 2–B feeds the amplifier output to the headphones 68 and switch 2–C switches the output of the record playback head to the amplifier input.

On depressing the Instructor Playback key 3, switch 3–A energizes Relay 1 which has the same functions which have been described above. Swith 3–B switches direct current power to the exciter lamp 40, switch 3–C switches the amplifier output to the headphones 68, and switch 3–D switches the output of photocell 42 to the amplifier input.

On depressing the Fast Forward key 4, switch 4–A energizes Relay 1, which has the same functions which have been described above. Switch 4–B disconnects power from the clutch 90 which connects the synchronous drive motor M–1 to the optical scanner 82 and sprocket drive 30. This optical scanner and sprocket drive is essentially a low friction part of the device which can be driven by the film at high speed without danger of damage to the film itself. In this fashion the picture is visible to the operator and the machine may be stopped at the desired point.

On depressing the Fast Reverse key 5, switch 5–A connects alternating current power to motor M–2, the reverse take-up motor. Switch 5–B supplies power to the projection lamp 36, and switch 5–C assures that no power can be supplied to the clutch 90.

The machine is brought to a full stop by pressing the Stop key 6. Switch 6–A energizes Relay 2 through the network R and C–2. This assures that Relay 2 will be energized for a period of time adequate to stop the movement of all parts, but will be released after this time to allow free rotation by hand of any of the sprockets or spindles. Contact RY2–1 will serve to keep RY1 energized for the duration of the braking period, provided Relay 1 was energized just prior to the pressing of the Stop key 6. In such a case, power will be applied to the brake 120 associated with motor M–2 through the contacts RY1–3 and RY2–3. Effectively, this allows braking action to be applied only to the trailing or supply reel and prevents overrun of this reel and film spillage. In case Relay 1 had not been energized prior to the pressing of the Stop key 6, braking current would have been applied to the brake 122 associated with motor M–3. This will be the case only during the Fast Reverse operation of the machine, when motor M–3 is the trailing motor.

In all cases when in the recording or the playback positions, power is supplied to the clutch 90 from the same line that is used to energize the operating Relay RY1. The synchronous motor M–1 will start as soon as the power is switched to the machine and will rotate until the motor is switched off. The amplifier A and D.C. power supply 74 are of conventional design, using transistors and semiconductor diodes as active elements.

It should be noted that motor M–1 rotates sprocket drive wheel 30 which engages the film strip at all times. This determines the normal, forward viewing speed of the film. Motor M–1 is connected to the sprocket wheel 30 through magnetic clutch 90 and gearing 88 to the rotating optical scanner 82, which, in turn, drives the sprocket wheel through a gear train 92, so that the optical scanner and sprocket are maintained in synchronized relation at all times. During the normal forward viewing function, the film strip is retained in a taut position by (a) a slight forward pull of the take-up reel 24 provided by motor M–3 directly coupled to the reel spindle 20, and (b) a slight braking effect of the supply reel 22 provided by a counterclockwise torque of motor M–2 directly coupled to the spindle 18 of the supply reel. During this function, motors M–3 and M–2 may supply a fraction of their rated torque, which should be just enough to keep the film taut. This may be accomplished by their being supplied through a circuit and voltage reducing network in a conventional manner. The above-described status of the drive system occurs during all three normal forward screening functions: Instructor Playback, Student Record, and Student Playback. During the other functions the motors M-2 and M-3 provide the driving and braking torques described below, and motor M-1 is disconnected from the system by the disengagement of clutch 90. This leaves the integrally connected optical scanner 82 and sprocket drive 30 free to rotate in either direction at the required high speed, the driving force in this case being provided by the moving sprocket opening 110 in the film strip 26 engaging the sprocket drive wheel 30. During this action, this engagement of the film sprocket assures that the optical scanner 82 will always be synchronized with the frames of the film regardless of speed or direction; hence proper animation will be observed on the screen at all times. The scanner-sprocket drive assembly is of extremely low inertia, and does not supply appreciable drag to the acceleration or deceleration of the film strip. During the Fast Forward action, full voltage may be impressed on motor M-3 while a slight braking action may be provided by the reverse torque of motor M-2 under reduced current and voltage. When the Stop key 6 is actuated at this point, the forward torque of motor M-3 ceases, and simultaneously a D.C. voltage may be applied to the windings of motor M-2, which acts as an electronic brake and quickly arrests the movement of the entire drive system. A similar, but reversed, stop action takes place during the Fast Reverse and Stop functions. The Stop action is essentially the same whether the film is traversing at a normal viewing speed or a fast reverse or forward speed at the time the Stop key 6 is actuated.

Conventional automatic limit sensing devices may be incoporated in the mechanism to prevent overrunning and unthreading of the end of the film.

The tension idlers 28 and 44 absorb any slight backlash resulting from the instantaneous starting and stopping of the film strip.

FIG. 4 illustrates a modification in which a single motor M is employed to operate the supply reel 22, the take-up reel 24, the sprocket drive 30, and the optical scanner 82. Except for the driving arrangement for the various movable parts, the modification shown in FIG. 4 is similar to that shown in FIG. 3 described above. Motor M is directly connected to gearing 96 which gearing is connected by means of individual drives to the supply reel spindle 18, take-up spindle 20, and to the optical scanner 82 and sprocket drive 30. The transmission between the gearing 96 and spindle 18 for supply reel 22 comprises a direct drive 97 and a slip drive 100, such as a spring belt drive. A clutch 98 is provided in the direct drive 97. This clutch may be of the magnetic type and is energized through the power selector 76. A similar transmission is provided for the spindle 20 of the take-up reel 24, and comprises a direct drive 103 and a slip drive 106. The direct drive 103 includes a magnetic clutch 104 energized from power selector 76. The drive between gearing 96 and the optical scanner includes a magnetic clutch 90 also energized from power selector 76. Sprocket 30 and optical scanner 82 are synchronized by means of a transmission including gearing 92, the latter being driven by means of the same transmission employed for the optical scanner 82.

As the electrical controlling circuit for the modification shown in FIG. 4 is obvious from a study of the electrical control circuit shown in FIG. 5, a separate showing of the electrical circuit for FIG. 4 has not been included.

The operation of the modification of FIG. 4 is similar to that described above in connection with FIG. 3 with the exception that, instead of energizing three separate motors, similar results are obtained by energizing clutches 90, 98, and 104 in the transmission between the motor driven gearing 96 and the spindle 18 for supply reel 22, spindle 20 for take-up reel 24, and the synchronously operated scanner 82 and sprocket drive 30.

In this system, all driving forces are supplied by the single speed motor M, directly connected to the gearing 96. The optical scanner-sprocket drive is driven, as in the three-motor modification, through magnetic clutch 90 which disengages at all speeds except normal forward viewing functions. This is a positive drive which maintains the correct viewing speed. At the same time clutches 98 and 104 are disengaged and slip drives 100 and 106 supply the slight forward torque on the take-up reel 24 and braking force on the supply reel 22. During the Fast Forward function, however, clutch 104 engages a direct drive between the gearing 96 and the spindle 20 of the takeup reel 24, which causes the takeup reel to rotate at a fast speed. A similar but reversed action through clutch 98 takes place during the Fast Rerverse function. At all times, the braking force in this system is supplied by separate magnetic brakes 102 and 108 attached, respectively, to the spindles 18 and 20 of the reels 22 and 24.

From the foregoing, it is evident that three distinct operating conditions can be selected. By pressing the Instructor Playback key 3, the film traverses forwardly at normal speed, preferably 24 frames per second, during which time the picture is projected on the screen 56, and the voice of the instructor or the sound of an instrument as recorded on the optical sound track 114, may be heard on the headphones 68, or on a speaker. The projected picture can be varied, but is usually related to the word or sound heard on the headphones. If the instruction on playing a musical instrument is involved, the picture could show the fingering and/or feet movement. If a language is being taught, the picture may be some particular object with or without the name thereon, while the instructor may pronounce and/or spell the name of the object. The picture may show the name alone, or may show the face of the instructor to assist the student in studying the formation of the mouth of the instructor in properly pronouncing the word. The student may then press the Fast Reverse key 5, which rapidly rewinds the film on supply reel 22. During this operation the optical scanner is driven by the film sprocket openings 110 and sprocket 30, so the student may be able to determine how far the film has reversed. When the film has reversed sufficiently, the Stop key 6 is depressed, which quickly brings the film to a halt. By pressing the Student Record key 1, the film is again projected on the screen, and at the same time, the magentic head assembly 38 is energized to erase the previous recording on the magnetic sound track 116 and to impress a new record thereon. The student may then, while viewing the picture on the screen, repeat into the microphone 70 the word or words of the instructor, or to play the musical notes previously heard from the instructor. During this traverse of the film the instructor's optical sound track is inoperative. Having made such a recording, the student may press the key 5 to the previous starting position, and then press the Student Playback key 2, which will reproduce the picture on the screen and will play back the student's recording. The two sound tracks on the film now have the instructor's recording and the student's recording of the same word, words, or other sounds, extending substantially along the same portion of the film. It is therefore a simple matter for the student to alternately press the Instructor Playback key 3 and the Student Playback key 2 to hear his own pronunciation of the words or rendition of the musical notes and to compare it with that of the instructor.

By operating the Fast Forward key 4, or the Fast Reverse key 5, the student or operator may rapidly traverse the film forwardly or backwardly to any desired position. Since the film operates the optical scanner 82 through the sprocket 30 during both of these operations, and the lamp and condenser assembly 36 is energized, a picture will always appear on the screen to enable the student or operator to determine which portion of the film is in position.

The function selector keys are interlocked by conventional means well known in the art, so that when any one key is depressed, all other keys are released, whereby only one key at a time will remain depressed.

While, in the example given above, the operation of the apparatus for the instruction of a language has been described, it is evident that the same method could be employed for instruction in other fields, such as, for instance, singing, playing musical instruments, etc.

Having fully described my invention, it is to be understood that I do not wish to be limited to the details herein set forth, by my invention is of the full scope of the appended claims.

I claim:

1. A method of audio-visual instruction employing an apparatus having a picture scanner and screen, means to magnetically record and play back a sound signal, means to play back a recorded optical sound track, and a film having thereon a picture, an optical sound track and a magnetic sound track, comprising the steps of (1) operating the optical sound play back means and simultaneously projecting a picture on the screen to show the instructor's oral pronunciation of the word or object being projected on the screen, (2) reversing the film, (3) again projecting the picture and operating the magnetic sound track recording means while the student repeats the instructor's previous pronunciation, (4) again reversing the film, and (5) projecting the picture and operating the magnetic sound playback to enable the student to appraise his own pronunciation.

2. A method of audio-visual instruction employing an apparatus having a picture scanner and screen, means to magnetically record and play back a sound signal, means to play back a recorded optical sound track, and a film having thereon a picture, an optical sound track and a magnetic sound track, comprising the steps of (1) operating the optical sound play back means and simultaneously projecting a picture on the screen to show the instructor's manner of formation of the sound being projected on the screen, (2) reversing the film, (3) again projecting the picture and operating the magnetic sound track recording means while the student repeats the instructor's previous manner of formation of the sound, (4) again reversing the film, and (5) projecting the picture and operating the magnetic sound playback to enable the student to appraise his own rendition.

3. An apparatus for audio-visual instruction, comprising uniformly rotatable means to traverse a film having a picture and a pair of sound tracks, at least one of said sound tracks being capable of being erased, means, including a uniformly rotatable optical scanner, to scan and to project the picture on a screen, a driving connection between said rotatable optical scanner and said film traverse means, independently controlled and selectively operable means to play back the recorded signals on each sound track, means to record and erase the signals on one of said sound tracks, a film supply spindle and a film take up spindle, and a single driving motor and disconnectible and connectible transmission connections to the rotatable optical scanner, to the film supply spindle, and to the film take up spindle.

4. An apparatus for audio-visual instruction, comprising uniformly rotatable means to traverse a film having a picture and a pair of sound tracks, at least one of said sound tracks being capable of being erased, means, including a uniformly rotatable optical scanner, to scan and to project the picture on a screen, a driving connection between said rotatable optical scanner and said film traverse means, independently controlled and selectively operable means to play back the recorded signals on each sound track, means to record and erase the signals on one of said sound tracks, a film supply spindle and a film take up spindle, one driving motor connected to the rotatable optical scanner, a second motor connected to the film supply spindle, and a third motor connected to the film takeup spindle, the connection between said one driving motor and said rotatable optical scanner including a selectively operable clutch.

5. An apparatus for audio-visual instruction according to claim 4, in which the driving motor for the picture scanning and film traverse means is a synchronous motor and the driving motors for the film supply and film takeup spindles are variable speed motors.

6. An apparatus for audio-visual instruction, comprising uniformly rotatable means to traverse a film having a picture and a pair of sound tracks, at least one of said sound tracks being capable of being erased, means, including a uniformly rotatable optical scanner, to scan and to project the picture on a screen, a driving connection between said rotatable optical scanner and said film traverse means, independently controlled and selectively operable means to play back the recorded signals on each sound track, means to record and erase the signals on one of said sound tracks, a film supply spindle and a film take up spindle, and selectively operable means to normally traverse the film forwardly while projecting the picture and playing back one sound track, to normally traverse the film forwardly while erasing a previous recording, recording, and projecting the picture, to normally traverse the film forwardly while playing back said latter recording and projecting the picture, to rapidly traverse the film forwardly, and to rapidly traverse the film in reverse.

7. An apparatus for audio-visual instruction, comprising a means to traverse a film having a picture and a pair of sound tracks, at least one of the sound tracks being capable of being erased, means to scan and project the picture on a screen, independently controlled means to play back the recorded signals on each sound track, means to record and erase the signals on one of said sound tracks, and selectively operable means to normally traverse the film forwardly while projecting the picture and playing back one sound track, to normally traverse the film forwardly while erasing a previous recording, recording and projecting the picture, to normally traverse the film forwardly while playing back said latter recording and projecting the picture, to rapidly traverse the film forwardly, and to rapidly traverse the film in reverse; said traversing means including a driving motor, a sprocket engaging the film, and a transmission between the driving motor and the sprocket including a clutch; means to interconnect the sprocket and scanning means to assure synchronism; and means to disconnect said clutch during said rapid forward and reverse traverse, whereby the scanning means will be operated by said sprocket.

8. An apparatus for audio-visual instruction, comprising a means to traverse a film having a picture, an optical sound track and an electromagnetic sound track, means to scan and project the picture on a screen, independently controlled means to play back the recorded signals on each sound track, means to record and erase the signals on the electromagnetic sound tracks; selectively operable means to normally traverse the film forwardly while projecting the picture and playing back the optical sound track, to normally traverse the film forwardly while projecting the picture, erasing a previous recording and recording on the magnetic sound track, to normally traverse the picture forwardly while projecting the picture and playing back the magnetic recording, to rapidly traverse the film forwardly, and to rapidly traverse the film in reverse; said traversing means including a driving motor, a sprocket engaging the film, and a transmission between the driving motor and the sprocket including a clutch; means to interconnect the sprocket and scanning means to assure synchronism; and means to disconnect said clutch during said rapid forward and reverse traverse, whereby the scanning means will be operated by said sprocket.

(References on following page)

References Cited in the file of this patent

UNITED STATES PATENTS

| | | |
|---|---|---|
| 1,928,255 | Holst | Sept. 26, 1933 |
| 2,071,192 | Younts | Feb. 16, 1937 |
| 2,416,353 | Shipman et al. | Feb. 25, 1947 |
| 2,628,288 | Blaney | Feb. 10, 1953 |
| 2,678,357 | Schuessler | May 11, 1954 |
| 2,858,996 | Switzer | Nov. 4, 1958 |
| 2,876,561 | Horne | Mar. 10, 1959 |

FOREIGN PATENTS

| | | |
|---|---|---|
| 763,341 | Great Britain | Dec. 12, 1956 |
| 766,434 | Great Britain | Jan. 23, 1957 |

OTHER REFERENCES

Ser. No. 386,191, Vignal, G. D. (A.P.C.), published Apr. 27, 1943.

Heath, D. L., A Language Laboratory Handbook for 1956, page 35.